Figure 1:
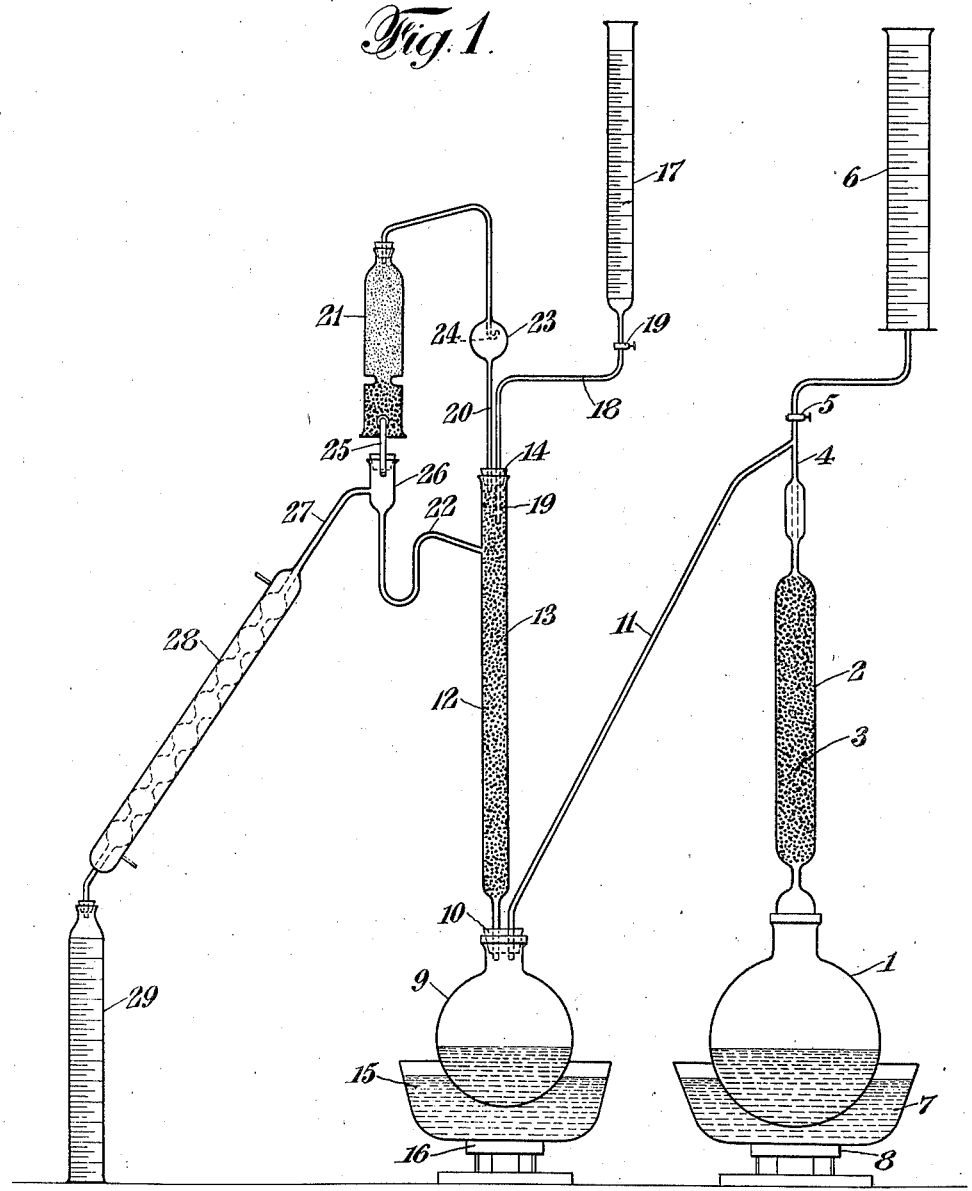

May 5, 1925.

H. F. WILLKIE

PROCESS OF PURIFYING ETHERS

Filed Sept. 10, 1921

1,536,544

2 Sheets-Sheet 1

Herman F. Willkie
Inventor
By Prindle, Wright, & Small
Attorneys

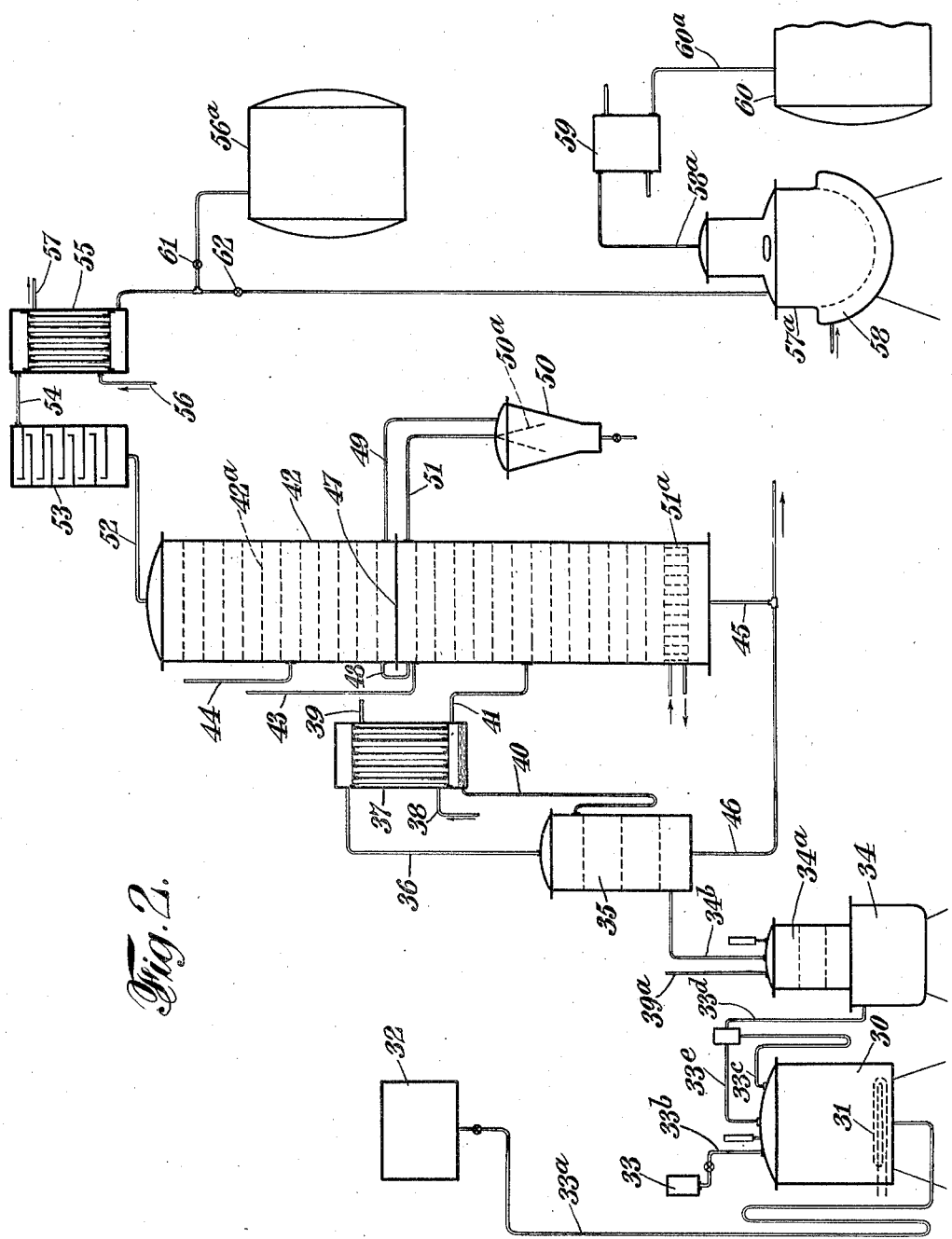

Patented May 5, 1925.

1,536,544

UNITED STATES PATENT OFFICE.

HERMAN F. WILLKIE, OF BALTIMORE, MARYLAND, ASSIGNOR TO U. S. INDUSTRIAL ALCOHOL CO., A CORPORATION OF WEST VIRGINIA.

PROCESS OF PURIFYING ETHERS.

Application filed September 10, 1921. Serial No. 499,616.

*To all whom it may concern:*

Be it known that I, HERMAN F. WILLKIE, a citizen of the United States, a resident of Baltimore, in the State of Maryland, have invented a certain new and useful Process of Purifying Ethers, of which the following is a specification.

This invention relates to a process of purifying ethers and more particularly to a process of purifying ethyl ether.

Previous attempts to purify certain such organic liquids have resulted in considerable loss of materials because of the fact that crude methods were used and no methods or apparatus were devised in order to carefully avoid loss of liquids and waste of the same. In the purification of ethyl ether it has been customary to wash it with water to remove some impurities, but this method does not succeed in removing all of the impurities and consequently it has been felt that there was wanting a complete and efficient method for the thorough purification of ether to render it strictly chemically pure. Where such methods of purification have been used they have been performed on a small laboratory scale as a rule, and no attempts have been made to erect a large commercial apparatus for the efficient purification of the liquids in question. In washing ether with water on a small scale, it has been found that a considerable part of the ether was lost due to its solution in the wash water, and in order to recover this ether a distilling outfit was necessary which involved additional expense. Furthermore, the drying of liquids with calcium chloride is a troublesome procedure when an attempt is made to rid the liquids of the water contained therein. There is also required a considerable handling of materials. These difficulties are accentuated when attempts are made to conduct the operations on a large scale, and in fact, such operations are quite impracticable and inefficient. Moreover, ether washed in the usual manner as above described almost always contains considerable quantities of alcohol so that at best the method is not a practical success.

This invention has accordingly as an object the purification of ethers and particularly ethyl ether and to recover them in a pure state by an inexpensive and efficient method. It has further as an object the operation of such a method on a large scale, in a rapid manner and without substantial loss of materials. It has as a further object the avoidance of handling of materials used in the purification process so that the process will be automatic as far as possible. It has also as an object the provision of such a method of purification which shall be continuous in its operation and in which the various chemicals involved in the process will be separately recovered.

While the process of the invention may be carried out in many forms of apparatus, for the sake of a specific embodiment two forms of apparatus are shown in the drawings, in which—

Figure 1 represents a small ether purification apparatus suitable for use in a laboratory, and Figure 2 represents an ether purification apparatus designed for handling large quantities of liquids.

These forms of apparatus may be used for purifying other organic liquids mentioned below.

In Fig. 1 a flask 1 is shown provided with a column 2 containing beads 3, which column merges into a tube 4 supplied with stop cock 5 for regulating a supply of liquid contained in the graduate 6. The flask 1 is heated by a basin of hot liquid 7 placed upon an electric hot plate 8. A second flask 9 is shown provided with a two-holed stopper 10 and a pipe 11 is connected to pipe 4 as shown. Through the outer hole is inserted a column 12 provided with glass beads 13 and having a closing stopper 14 at the upper end, also provided with two holes. The flask 9 is shown as immersed in the hot liquid 15 in a basin placed upon an electric plate 16. A graduate 17 is positioned to conduct liquid through a tube 18 provided with cock 19 to the top of the column 13. The end 19 of the tube 18 projects a short distance into the beads in order to provide a rectifying column of beads after the vapors leave the liquid wash issuing from tube 18. An exit tube 20 leads from the column 13 over to a drier 21 filled with a dehydrating substance such as calcium chloride, and there is provided a return flow tube 22 leading back to the column 13. A bulb 23 is provided in the pipe 20 and contains a bent-over piece of tube 24 to prevent liquid from passing over into the dehydrater 21. From the dehydrater a tube 25 leads to a receiver 26 from which a tube 27 leads to a condenser 28 delivering to a graduate 29.

In the operation of this apparatus crude ether is placed within the flask 1 and the liquid in basin 7 is heated so as to cause the ether to distill off and pass into the column 2 through which water is trickled on opening the stop cock 5, the graduate 6 having previously been filled with water. The ether vapors after receiving a thorough washing in column 2 proceed by way of pipe 11 to flask 9 and pass thence up into the column 12 where they are treated with a potassium permanganate wash issuing from cylinder 17. The ether vapors are prevented from condensing in flask 9 by keeping the liquid in said flask at a temperature above the boiling point of ether, e. g. 35° C. The ether vapors traverse the column 12 and the remaining impurities are therein removed by the permanganate so that on issuing into the pipe 20 the ether vapors contain nothing but water as an impurity. This is removed in the dehydrater 21 and the pure ether vapors then pass down into condenser 28 where they are condensed and received as practically 100% pure ether in receiver 29.

In the second form of apparatus used in carrying out the invention shown in Fig. 2, the kettle 30 represents a manufacturing kettle for manufacturing the crude ethyl ether and this is provided with a steam coil 31 and an alcohol supply tank 32 and sulphuric acid supply tank 33 connected to the kettle 30 by the pipes 33ª and 33ᵇ respectively. Suitable pipes 33ᶜ and 33ᵈ having a return pipe 33ᵉ conduct the ether vapors over into a caustic scrubber 34 having perforated diaphragms 34ª whence they pass by pipe 34ᵇ to an ether still 35 connected by pipe 36 to dephlegmator 37, which is cooled by water entering at pipe 38 and issuing at 39. The caustic scrubber 34 is supplied through pipe 39ª, with a scrubbing liquid comprised of 10 to 20% by wt. of sodium hydroxide in water. A return pipe 40 is provided for returning condensed liquids back to the still. The uncondensed ether vapor passes through pipe 41 to the purifying column 42 having perforated diaphragms 42ª and is treated in this column with a potassium permanganate solution. This column is provided with a water inlet 43 and a permanganate inlet 44 and has an exit pipe 45 connected to an exit pipe 46 from the still 35 leading to an alcohol recovery system not shown. A plate 47 is provided near the center of the column 42, and this plate is impervious to liquids and gases, but in order to permit of the passage of ether vapors upwardly through the column, a pipe 48 is provided in the form of a by-pass so that the ether may pass around plate 47 and into the column 42. The permanganate liquid arriving at the bottom of the upper section of the tank adjacent the plate 47, issues through pipe 49 to a sediment separator 50 having baffles 50ª, and a pipe 51 is provided for the return of gases to the column. A steam heating device 51ª is placed at the bottom of the column to drive the ether vapors upwardly through the column and prevent their condensation.

These ether vapors issue from the top of the column through pipe 52 to a dehydrater 53 containing plates for holding a dehydrating agent such as $CaCl_2$ and pass thence through pipe 54 to a condenser 55 cooled by water entering at 56 and leaving at 57. The condensed ether may be stored in tank 56ª or may be passed to a finishing still 57ª which is provided with a steam jacket 58. The ether distilled from this still passes out by a pipe 58ª and is condensed in the condenser 59 from which it passes to a storage tank 60 by a pipe 60ª. Valves 61 and 62 are provided for directing the ether either to the tank 56ª or to the still 57ª.

In the operation of this commercial large-scale apparatus, the ether is manufactured from sulphuric acid and alcohol in manufacturing kettle 30 and passes over into a caustic scrubber 34 to remove the acid remaining in the ether, and thence passes to an ether still 35 to separate out the alcohol from the ether. The ether issuing from pipe 36 from the still is passed through a condenser 37 to remove the last portions of alcohol and then enters the column 42 through pipe 41. As the vapor enters this column, it passes upwardly, being prevented from condensing by the heat of the steam coils 51ª, and encounters a stream of water flowing over the plates of the column whereby it is thoroughly washed so that certain impurities are removed, these impurities comprising alcohol, peroxides, sulphates, benzol, and odorous impurities as for example fusel oil. The water and impurities are passed out through pipe 45 while the ether vapor passes through pipe 48 and then encounters a stream of potassium permanganate descending through the plates of the tower, with a result that the ether is further purified by the permanganate and the remaining impurities are removed, these impurities comprising aldehydes, various acids and carbon dioxide. During this reaction the permanganate is reduced to manganese dioxide and this collects in a sort of sludge in 50. The ether vapor thus thoroughly purified passes out through pipe 52 to a dehydrater 53 where it is dried to remove the last portions of water, and it is then condensed in chamber 55 and stored at once either in tank 56ª or passed on to the still 57ª for a redistillation to separate out the last traces of water which were not removed in dehydrater 53. The ether thus distilled in still 57ª is condensed in condenser 59 and stored in tank 60.

In the above processes the permanganate solution used should preferably contain from .2 gram to .5 gram potassium permanganate per litre and from 2 to 5 grams sodium hydroxide per litre, but may contain more or less of these ingredients according to the nature of the process. It may consist of a saturated solution of permanganate of potassium in strong sodium hydroxide. In the apparatus shown in Fig. 1 an alkaline permanganate containing .07% potassium permanganate and .5% sodium hydroxide was found to be efficient. Besides potassium permanganate other permanganates may be used such as sodium permanganate or calcium permanganate. Other alkalies may be used such as potassium hydroxide, milk of lime, carbonates of alkalies, etc. Other oxidizing agents such as dichromates, peroxides, etc. may be used in place of permanganate. It is preferable to wash first with water and then with permanganate, but the two operations may be combined if desired. Water may be replaced by petroleum oils, glycerine, glycol, etc. In place of calcium chloride other drying agents may be used such as normal potassium carbonate, sulphuric acid, phosphorus oxide or any other similarly acting substance.

The process may be continuous or intermittent, and in the forms of apparatus shown the process may be conducted either way.

The temperatures used in the above described process may range from 35° C. to 100° C. and preferably from 40° C. to 60° C., these being the temperatures used in the purifying column 42. No particular temperature, however, is considered essential in this process as long as it is within reasonable limits of operation.

The impurities existing in crude ethyl ether are typical of the impurities which may be found in other ethers above described, and these impurities comprise benzol, fusel oil, methyl sulfide, acrolein, peroxides, sulphates, sulphur dioxide, aldehydes, alcohol, organic acids, unsaturated compounds such as vinyl alcohol and others. It has been found that washing with water alone will remove alcohol, peroxides, sulphates, benzol, some odorous impurities, etc. but will not remove aldehydes, acids or $CO_2$, whereas washing with alkaline permanganate solution will remove the aldehydes, acids and $CO_2$ so that by the use of the two washes a complete removal of all impurities is obtained.

It has been found that the above described process produces a very pure ether containing only traces of impurities, and only a fraction of a gram of water per 100 c. c. of ether. It has been found possible to remove all of the alcohol so that not even a trace remains, and, as before stated, it has been found that all of the other impurities can be totally removed. Moreover, there is practically no loss of ether in the system so that all of the ether is recovered, thus avoiding an objection to the former methods of washing ether. The process as carried out in either form of apparatus or in other forms of apparatus is very efficient chemically in the use of purifying chemicals, economical in cost of labor and handling of materials, and causes practically no trouble while in operation. It is therefore apparent that a process has been devised which will purify ether and similar liquids in a manner heretofore unknown, with the most satisfactory results.

As many apparently widely different embodiments of this invention may be made without departing from the spirit thereof, it is to be understood that I do not intend to limit myself to the specific embodiment thereof except as indicated in the appended claims.

I claim:

1. A process of purifying an ether comprising washing it with water and then with an oxidizing liquid.

2. A process of purifying an ether comprising distilling it, washing the vapors with water, then with a dilute oxidizing liquid, and then drying the vapors and condensing them.

3. The process of purifying ethyl ether comprising washing it with water and then with an oxidizing liquid.

4. The process of purifying ethyl ether comprising washing it with water and then with an alkaline permanganate solution.

5. The process of purifying ethyl ether comprising washing it with water and then with an alkaline permanganate solution, and then drying it.

6. The process of purifying ethyl ether comprising distilling it and passing the vapors through a column supplied with a washing liquid comprising water and then passing the vapors through a column supplied with a washing liquid comprising an oxidizing liquid.

7. The process of purifying ethyl ether comprising distilling it and passing the vapors through a column supplied with a washing liquid comprising water, and then passing the vapors through a column supplied with a washing liquid comprising an alkaline permanganate.

8. The process of purifying ethyl ether comprising distilling it and passing the vapors through a column supplied with a washing liquid comprising water, then passing the vapors through a column supplied with a washing liquid comprising an alkaline permanganate, and then passing the vapors through a drying column and condensing them.

9. The process of purifying ethyl ether comprising distilling it, washing the vapors with water, then with a dilute oxidizing liquid, and then dryng the vapors and condensing them.

10. The process of purifying ethyl ether comprising vaporizing it, washing the vapors with water, then with a dilute alkaline permanganate solution, then drying the vapors, and condensing them.

11. A process of purifying an ether comprising distilling it, washing the vapors with water, then with an oxidizing liquid, and then drying the ether.

In testimony that I claim the foregoing, I have hereunto set my hand this 28th day of July, 1921.

HERMAN F. WILLKIE.